United States Patent
Santos et al.

(10) Patent No.: US 11,567,493 B2
(45) Date of Patent: Jan. 31, 2023

(54) METHOD AND SYSTEM FOR CONTROLLING COMMUNICATION OF A MINING AND/OR CONSTRUCTION MACHINE

(71) Applicant: EPIROC ROCK DRILLS AKTIEBOLAG, Örebro (SE)

(72) Inventors: Wesley Santos, Örebro (SE); Roland Pettersson, Örebro (SE); Rickard Egbäck, Kumla (SE); Håkan Lundvall, Lillkyrka (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 324 days.

(21) Appl. No.: 16/771,956

(22) PCT Filed: Dec. 21, 2018

(86) PCT No.: PCT/SE2018/051360
§ 371 (c)(1),
(2) Date: Jun. 11, 2020

(87) PCT Pub. No.: WO2019/125297
PCT Pub. Date: Jun. 27, 2019

(65) Prior Publication Data
US 2021/0173392 A1    Jun. 10, 2021

(30) Foreign Application Priority Data
Dec. 22, 2017    (SE) .................................. 1751633-7

(51) Int. Cl.
*H04N 5/44*    (2011.01)
*G05D 1/00*    (2006.01)
(Continued)

(52) U.S. Cl.
CPC ......... *G05D 1/0022* (2013.01); *G05D 1/0088* (2013.01); *G05D 1/0212* (2013.01);
(Continued)

(58) Field of Classification Search
CPC .. G05D 1/0022; G05D 1/0088; G05D 1/0212; G05D 2201/0202;
(Continued)

(56) References Cited

U.S. PATENT DOCUMENTS 6,633,800 B1    10/2003  Ward et al.
7,937,104 B2 *   5/2011  Lintula .................... G08G 1/20
                                                         455/66.1
(Continued)

FOREIGN PATENT DOCUMENTS

CN        101236431 A     8/2008
CN        103051982 A     4/2013
(Continued)

OTHER PUBLICATIONS

International Search Report and Written Opinion in corresponding international application No. PCT/SE2018/051360 dated Apr. 1, 2019 (12 pages).

(Continued)

*Primary Examiner* — Munear T Akki
(74) *Attorney, Agent, or Firm* — Sage Patent Group

(57) ABSTRACT

The present invention relates to a method for 1 for controlling transmission of data in a data communication network, the transmission of data being a transmission of data between a mining and/or construction machine and a network node of said data communication network, said transmission of data being carried out at least partly over a wireless communication link. The method comprises: —estimating a measure of the communication capacity of said wireless link, the estimation being based at least partly on a (Continued)

round-trip time of a transmission over said wireless communication link, and —adapting the data transmission load of said mining and/or construction machine on the wireless communication link on the basis of said measure. The invention also relates to a system and a mining and/or construction machine.

16 Claims, 3 Drawing Sheets

(51) Int. Cl.
*G05D 1/02* (2020.01)
*H04B 17/318* (2015.01)
*H04L 43/0864* (2022.01)
*E21F 17/18* (2006.01)

(52) U.S. Cl.
CPC ....... *H04B 17/318* (2015.01); *H04L 43/0864* (2013.01); *E21F 17/18* (2013.01); *G05D 2201/021* (2013.01); *G05D 2201/0202* (2013.01)

(58) Field of Classification Search
CPC ............ G05D 2201/021; H04B 17/318; H04L 43/0864; H04L 43/10; H04L 47/283; E21F 17/18; E21C 35/24
See application file for complete search history.

(56) References Cited

U.S. PATENT DOCUMENTS

| | | | |
|---|---|---|---|
| 9,716,667 B2 * | 7/2017 | Clevorn | .................. H04L 47/27 |
| 11,115,305 B2 * | 9/2021 | Krol | ...................... H04W 24/06 |
| 2008/0084821 A1 * | 4/2008 | Maze | .................. H04L 43/0847 |
| | | | 370/310 |
| 2008/0137589 A1 | 6/2008 | Barrett | |
| 2008/0159244 A1 | 7/2008 | Hunziker | |
| 2008/0250144 A1 * | 10/2008 | Choi | .................... H04L 43/0858 |
| | | | 709/227 |
| 2009/0034610 A1 | 2/2009 | Lee et al. | |
| 2010/0054139 A1 * | 3/2010 | Chun | ..................... H04L 1/1848 |
| | | | 370/252 |
| 2010/0106356 A1 | 4/2010 | Trepagnier et al. | |
| 2011/0035106 A1 | 2/2011 | Hauler | |
| 2012/0163203 A1 | 6/2012 | Wilkinson et al. | |
| 2012/0287986 A1 | 11/2012 | Paniconi et al. | |
| 2012/0293653 A1 | 11/2012 | Schweikart | |
| 2013/0101002 A1 | 4/2013 | Gettings et al. | |
| 2014/0101332 A1 | 4/2014 | Lipman et al. | |
| 2015/0350289 A1 | 12/2015 | Clem et al. | |
| 2016/0295295 A1 | 10/2016 | Dixit et al. | |
| 2017/0182664 A1 | 6/2017 | Watts | |
| 2021/0328897 A1 * | 10/2021 | Sridhar | ................... H04L 47/22 |
| 2021/0377877 A1 * | 12/2021 | Kazmi | ................ H04W 52/143 |

FOREIGN PATENT DOCUMENTS

| | | |
|---|---|---|
| CN | 105659560 A | 6/2016 |
| CN | 105721333 A | 6/2016 |
| CN | 107027006 A | 8/2017 |
| CN | 107196863 A | 9/2017 |
| EP | 1466075 B1 | 5/2008 |
| EP | 1993237 A2 | 11/2008 |
| SE | 527936 C2 | 7/2006 |
| SE | 529645 C2 | 10/2007 |
| SE | 533407 C2 | 9/2010 |
| WO | 2005052515 A1 | 6/2005 |
| WO | 2014187473 A1 | 11/2014 |
| WO | 2015023654 A1 | 2/2015 |

OTHER PUBLICATIONS

Einicke et al.; "The Application of Wireless LANS in Mine Automation", Aug. 2002 (10 pages).
Zhu et al.; "Video Streaming Over Wireless Networks"; Stanford University (5 pages).
First Office Action dated Sep. 15, 2022 for Chinese Patent Application No. 201880082012.X, 11 pages.

* cited by examiner

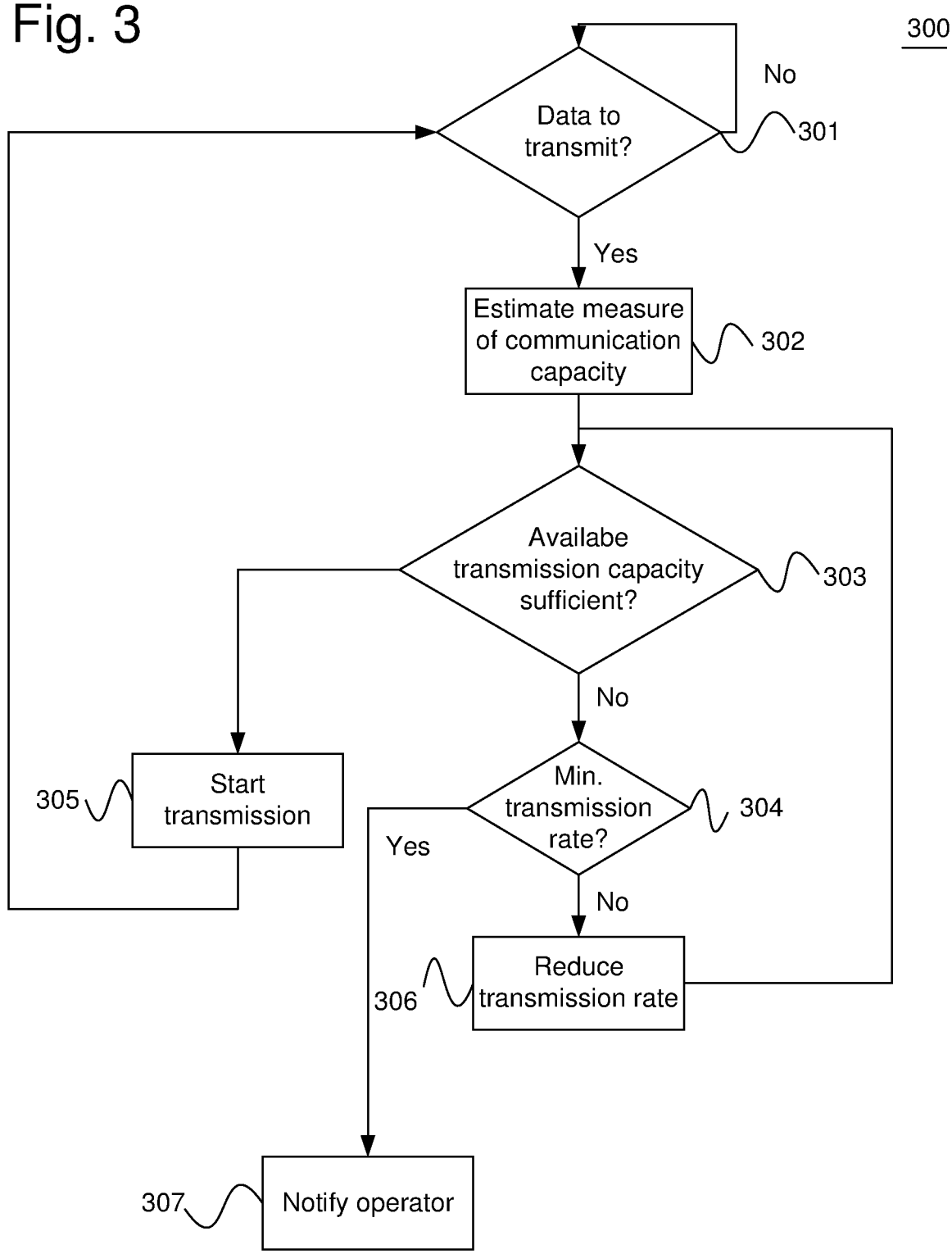

METHOD AND SYSTEM FOR CONTROLLING COMMUNICATION OF A MINING AND/OR CONSTRUCTION MACHINE

CROSS-REFERENCE TO RELATED APPLICATIONS

This application is a U.S. National Stage application of PCT/SE2018/051360, filed Dec. 21, 2018 and published on Jun. 27, 2019 as WO 2019/125297, which claims the benefit of Swedish Patent Application No. 1751633-7 filed Dec. 22, 2017, all of which are hereby incorporated by reference in their entireties.

FIELD OF THE INVENTION

The present invention relates in particular to mining and tunnelling, and more specifically to a method and system for controlling communication of mining and/or construction machine. The invention also relates to a mining and/or construction machine, as well as a computer program and a computer-readable medium that implement the method according to the invention.

BACKGROUND OF THE INVENTION

With regard to mining and tunnelling, for example, there is a constant ongoing process of improving e.g. efficiency, productivity and safety. Examples of changes/improvements that are carried out to an increasing extent is the automation of, fully or partly, and/or to control remotely, various processes occurring in mining.

It is, for example, often desirable that at least part of the machines that are used in mining/tunnelling can be driven in a fully autonomous mode, i.e. without an operator being required to influence the steering. Autonomous operation, however, is not always suitable or economically justifiable.

This may be the case, for example, in environments that constantly change. There exist, for example, mines where new galleries/drifts frequently arise, and where older drifts may be refilled, which normally has an impact on autonomous operation of machines. This may be because a setup of a fully autonomous solution oftentimes is relatively time and resource consuming, and a new setup is at least partially required as soon as the environment in which the autonomous machine is driven changes.

Still, e.g. for reasons of safety, it is oftentimes a desire that the machines are not driven by an onboard operator. This may be avoided by machines, instead, being driven by means of remote control, where an operator, for example being located in a control room out of view from the machine, controls the machine by means of suitable manoeuvring means such as, for example, control sticks.

With regard to remote control various kinds of machines may be controlled in this manner. For example, the control may be utilized to control so called LHD (Load-Haul-Dump) machines, which often are used to remove and transport broken rock/ore from, for example, a position where blasting has been performed to another position for further processing. The remote control has the advantage that the operator can be removed from the dangerous environment in which the machine works to a considerably safer location such as, for example, a control room.

Remote control can also be used for other kinds of machines, e.g. when drilling by means of drilling rigs, where e.g. the actual drilling may be controlled from a remote location to reduce the risk for accidents involving mine personnel. Remote control may also be utilized e.g. to control mine trucks as well as other kinds of machines.

With regard to the utilization of autonomous machines and remote-controlled machines there is, perhaps in particular with regard to remotely controlled machines, an ongoing exchange of data between the machine and, e.g., a control station from which an operator controls the machine. The data being exchanged may, for example, comprise steering commands for manoeuvring the machine, sensor data from various sensors arranged on the machine and video data (video streams) from one or more video cameras arranged on the machine to facilitate the remote-control operation of the machine.

In order to properly control machines in this manner, consequently, it is relied upon a communication of data that provides the desired data in a timely manner.

In case the remote controlled machine is stationary or substantially stationary, which, for example, often can be considered to be the case with a drilling drill rig being moved by only comparatively small steps at a time, the timeliness of the data exchange may be less significant but when remote controlling e.g. loading machines or mine trucks, which may be arranged to be remote controlled for longer distances in, for example, a mine, a reliable data exchange may be a prerequisite to be able to safely manoeuvre the machine.

SUMMARY OF THE INVENTION

It would hence be advantageous to achieve a method and system that may improve reliability and/or predictability if the data communication between a mining and/or construction machine and a remote location, where the communication at least partly is carried out over a wireless data communication link.

According to the present invention, it is provided a method for controlling transmission of data in a data communication network, the transmission of data being a transmission of data between a mining and/or construction machine and a network node of said data communication network, said transmission of data being carried out at least partly over a wireless communication link, the method includes:

estimating a measure of the communication capacity of said wireless link, the estimation being based at least partly on a round-trip time of a transmission over said wireless communication link, and adapting the data transmission load of said mining and/or construction machine on the wireless communication link on the basis of said measure.

As was mentioned above, there oftentimes exist a desire to remotely control, and/or autonomously operate, various machines in mining and/or tunnelling. When remotely controlling a machine, and at least to some extent also when autonomously operating machines are in operation, there is an ongoing exchange of data between the machine and a network node such as, for example, a control station, such as e.g. a computer or the like, from which the machine is being controlled. The network node may be located such that the mining/construction machine is not within view of the operator, e.g. in a different part of a mine, or at a location being remote from the mine.

The mining and/or construction machine is configured to communicate over the wireless link with the network node which hence is located upstream the wireless link as seen from the mining/construction machine.

With regard to the communication between the network node and the mining and/or construction machine, the data being transmitted may, for example, comprise control commands for manoeuvring the machine, sensor data emanating from various sensors arranged on the machine, and/or video data (video streams) from one or more cameras arranged on the machine, where the video data may e.g. be utilised to facilitate remote control or monitor the operation of an autonomously operating vehicle. Other kinds of data may also be transmitted as is exemplified below.

The communication over the wireless link may be carried out according to any suitable standard for as long as criteria desired for the communication are fulfilled. For example, WLAN, WiMAX, Wireless Mesh Networks or any other suitable wireless network technology, such as any suitable telecommunication standard, may be utilized to provide for the communication over the wireless link.

The data that are transmitted between the mining/construction machine and the network node inherently generates a network load. For as long as the network load is below the capacity of the network, the communication between machine and network node may take place in a desired manner. If, however, the network load exceeds some critical point, data packets may be lost and this may result in retransmissions of data that further congests the network and thereby further reduces communication capacity. This, in turn, may have as result that reliable communication between machine and network node may be lost, so that e.g. a remote-control operator may no longer be able to control the machine, and the machine therefore stop operating.

In general, problems of this kind arise when the available communication capacity of the wireless link is reduced and/or becomes congested. The capacity of wired portions of the network in the transmission of data between machine and network node in general have higher capacity.

In case the machine is stationary, or substantially stationary, as is oftentimes the case with regard to a drill rig that is setup for drilling, which may be moved between rounds of drilling and blasting by comparatively small distances, e.g. not more than 1-10 metres at the time, a loss of communication due to congestion may be perhaps less likely to be lost and may also more easily be recovered, while machines being in motion may move further away from a wireless access point of the data communication network and which provides wireless access to the data communication network. Such machine movement may further deteriorate the wireless link.

Communication network infrastructure of mines and tunnel constructions are oftentimes under the control of the site owner, such as e.g. a mine owner. This means that the quality of the infrastructure, e.g. in terms of communication capacity, may vary to a great extent from one site to another, e.g. in dependence on the level of priority that the site owner assigns to the wireless communication capabilities. Still, machines being used in different sites having different communication capacities may still be very similar and essentially have the same communication capacity requirements. The machines may also e.g. be manufactured without knowledge of the prevailing communication conditions at the site where it is intended to operate. This may impose problems, in particular when communication capacity is low. For example, sites may have an infrastructure where e.g. access points for allowing wireless communication are spaced apart by only very small distances from each other, such as 5 to 10 m, to thereby provide a data communication capacity, while other sites may not prioritise wireless communication, and where, instead, wireless access points may be spaced apart by 50 to 100 metres or more. Movable machines having essentially the same general communication requirement may hence face completely different communication possibilities in dependence on the site the machine is operating in.

According to embodiments of the invention, situations of this kind can be at least partly accounted for and problems mitigated by a system where, when data is to be transmitted between a mining and/or construction machine and a network node of the data communication network, communication between the machine and network node being transmitted over the wireless link, a measure of the communication capacity of the wireless link is estimated to determine transmission possibilities.

In this way, the load of the machine can be adapted to the prevailing communication capabilities, so that the data transmission rate e.g. can be reduced when the communication capacity is reduced, to thereby reduce the risk of congestion arising and thereby also loss of communication with a machine.

The estimation of the communication capacity may e.g. be an estimation of a possible transmission rate, such as bit rate, e.g. expressed in bits/unit time that may be transmitted over the wireless link. Similarly, the transmission load imposed by a mining and/or construction machine may be a bit rate.

With regard to the estimation of communication capacity of the wireless link, e.g. a signal strength of the wireless access point of the data communication network may provide an indication of the available communication capacities. However, a high signal strength may not necessarily mean that communication capacity is high. For example, the signal strength determination may be performed e.g. on a radio beacon signal of a wireless access point, while actual communication capacity may be reduced e.g. by other machines already occupying part or all of the communication capacity, and/or other communication of other machines with other wireless access points interfering with the communication and thereby reducing available communication capacity.

According to the invention, therefore, when estimating a measure of the communication capacity, although the signal strength may be taken into consideration, a round-trip time, also known as round-trip delay time, of a transmission over said wireless communication link is determined, and the measure of the communication capacity is based at least partly on this round-trip time.

The data transmission load, such as data transmission rate, on the wireless communication link from said mining and/or construction machine is then adapted, such as e.g. increased or reduced, based on said measure.

The round-trip time is well defined in the art, and is the time it takes for a data packet to travel from a transmitter to a receiver, the receiver transmitting an acknowledgement, and the transmitter receiving an acknowledgement that the data packet was received by the receiver. Hence the round-trip time may be determined by transmitting at least one data packet over the wireless link to and/or from the machine and determining the round-trip time as the time it takes for the transmitter to receive an acknowledgment of receipt of said at least one data packet from the receiver.

Such functionality may be realised in various manners. For example, the well-known "ping" utility may be utilised. Ping measures the round-trip time for messages sent from a transmitter to a receiver (destination) to be echoed back to the transmitter.

The round-trip time may provide a more accurate measure of the available communication capacity, where a longer round-trip time may indicate a reduced communication capacity, since a prolonged data packet travel time may indicate congestion. According to the invention, the load that the mining and/or construction machine imposes on the wireless link is adapted on the basis of the obtained measure of the capacity of the link. The use of the round-trip time when determining the measure, inter alia, has the advantage that the load may be reduced in situations when e.g. signal strength measurements indicate a high communication capacity. In this way, the risk of the machine being lost due to communication overload may also be reduced.

The at least one data packet being transmitted when determining the round-trip time may be from the mining and/or construction machine to a network node of said data communication network. In this way, the determination of the round-trip may be initiated, and controlled by, the mining and/or construction machine, so that the estimation of the available communication capacity of a wireless link may be estimated by the machine e.g. prior to transmission of data to said network node is to commence, and/or when the amount of data being transmitted by the machine is to increase.

Furthermore, when estimating the measure of the communication capacity of the wireless link, further factors may be taken into account. For example, in addition to the round-trip time, one or more from the group: jitter, signal strength, the number of lost data packages per unit time, signal-to-noise ratio, bit error rate and/or data throughput may be taken into account. In this way, the accuracy in the estimation may be improved.

The transmission load that the mining and/or construction machine imposes and/or intends to impose on the wireless link, e.g. upon commencing communication with said network node, can be compared with the measure of the communication capacity of the wireless link, and the load that said mining and/or construction machine imposes, or is about to impose may then be adapted on the basis of said comparison so that the imposed load does not exceed the available capacity of the wireless link.

It may be determined if the transmission load that the mining and/or construction machine imposes and/or intends to impose on the wireless link exceeds the estimated available communication capacity, and if so a data transmission rate of the mining and/or construction machine can be reduced to a data transmission rate resulting in a load being below the estimated capacity of said wireless link.

A plurality of consecutive round-trip times may be determined, e.g. when communication is ongoing and/or prior to communication commences. The load that the mining and/or construction machine imposes on the wireless link may then be controlled on the basis of changes in time of the round-trip time and which can be determined from the plurality of consecutive round-trip delays.

The transmission rate of the transmission of data from the mining and/or construction machine may be increased when the derivative over time of the round-trip time decreases, which hence indicates an increase in the available communication capacity. Alternatively, or in addition, the transmission rate of transmission of data from the mining and/or construction machine may be decreased when the derivative over time of the round-trip time increases, which hence indicates an ongoing decrease in the available communication capacity.

According to embodiments of the invention, the data transmission rate of the mining and/or construction machine is continuously adapted to changes in the available communication capacity.

Furthermore, the mining and/or construction machine may be configured to, when changing the data transmission rate, changing the transmission rate to one of a plurality of predefined transmission rates. For example, the transmission rate may be controlled to a predetermined transmission rate being as close as possible to, but not exceeding, the available communication capacity. The predefined transmission rates may comprise at least a maximum transmission rate to be used by the mining and/or construction machine and at least one lower transmission rate than said maximum transmission rate. According to embodiments of the invention, a plurality of different transmission rates being lower than a maximum transmission rate may be utilised.

With regard to the load, i.e. transmission rate, that the machine imposes on the wireless interface, this may be reduced, for example, by reducing the amount of data per unit time being transmitted of one or more video streams being transmitted by the machine, e.g. by reducing video resolution, and/or reducing a frame rate. Also, the number of video streams being transmitted may be changed in dependence of the available communication capacity.

Furthermore, the load may be reduced, in addition or alternatively, by limiting the types of data may be transmitted while transmission of other types of data may be prohibited.

For example, transmission of different kinds of data can be prioritised. In this way e.g. control commands that are required to be able to carry out remote control of the machine, or otherwise critical to the control of the machine, can be prioritised so that such data is transmitted prior to any other less critical data is being transmitted.

Data where the transmission is not critical to the operation of the machine can be given a low priority so that such data may not be transmitted at all, or only to a reduced extent when communication capacity is limited.

Data of this kind may include, for example, any one or more from the group:
  software updates for updating software in the machine;
  map data, which e.g. may be downloaded to the machine. Also, measurements performed in the machine, e.g. to be used in the creation of maps, can be transmitted from the machine to a network node;
  log data, e.g. containing one or more logs of the operation of the machine;
  other operational data, e.g. regarding the operating status of the machine and that are not being critical to the operation of the machine;
  telematics data, such as, for example, transmission of location, movements, status behaviour and other kinds of telematics data that may be transmitted from the machine during normal operation.

Hence the data transmission can be prioritised, for example, in a manner such that control commands required for the remote control is transmitted first to ensure such data to be successfully transmitted. Data where the transmission is not critical to the operation of the machine can be completely stopped or the transmission can be reduced so that video data can be carried out to a higher extent if desired at the expense of such other data. Further, as was mentioned, if the transmission capacity is sufficient for transmission also of video data, such data may also be transmitted, where e.g. resolution, and/or frame rate of the video data can be reduced to meet the current communication capacity.

Then non-critical data may then be transmitted when the communication capacity again allows for also such data to be transmitted.

According to embodiments of the invention, the speed of travel of the machine may be configured to be automatically reduced when the transmission rate is reduced e.g. to allow an operator to manoeuvre the machine with safety also e.g. when a reduced video quality may have a negative impact on the manoeuvring of the machine.

It will be appreciated that the embodiments described in relation to the method aspect of the present invention are all applicable also for the system aspect of the present invention. That is, the system may be configured to perform the method as defined in any of the above described embodiments. Further, the method may be a computer implemented method which e.g. may be implemented in one or more control units of a mining and/or construction machine.

The machine may be an underground mining and/or construction machine.

Further characteristics of the present invention and advantages thereof are indicated in the detailed description of exemplary embodiments set out below and the attached drawings.

BRIEF DESCRIPTION OF THE DRAWINGS

FIG. 3 illustrates an exemplary method according to the invention.

DETAILED DESCRIPTION OF EXEMPLARY EMBODIMENTS

Figure 1A:
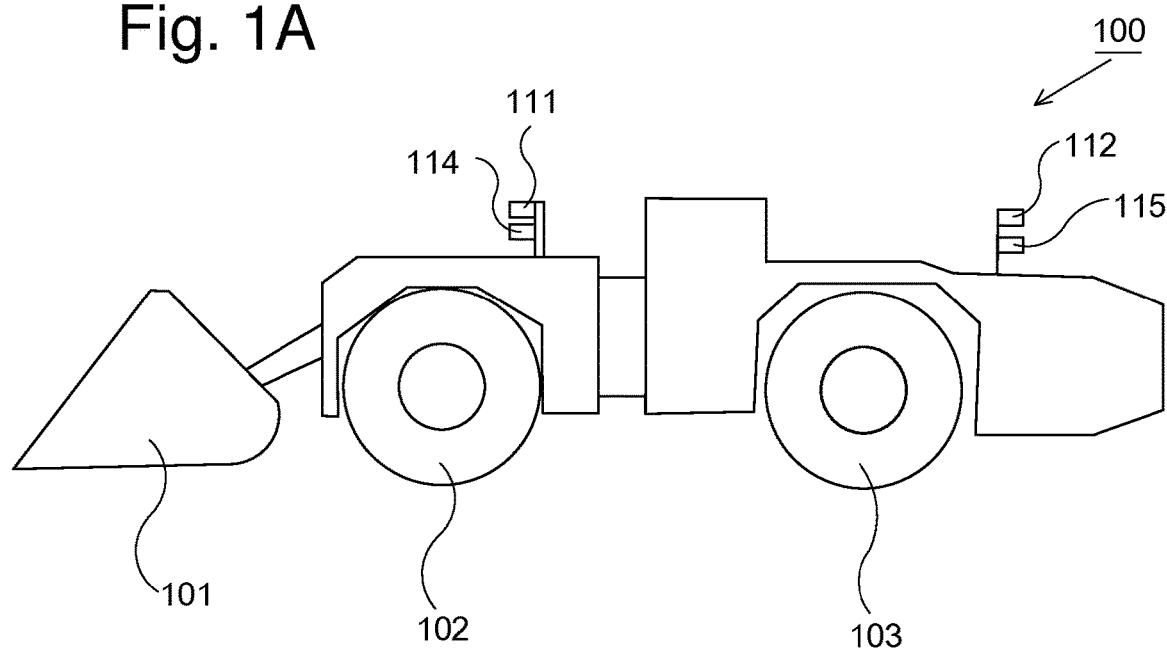
FIG. 1A-B illustrates an exemplary machine which may be configured to operate according to embodiments of the invention.
Figure 1B:
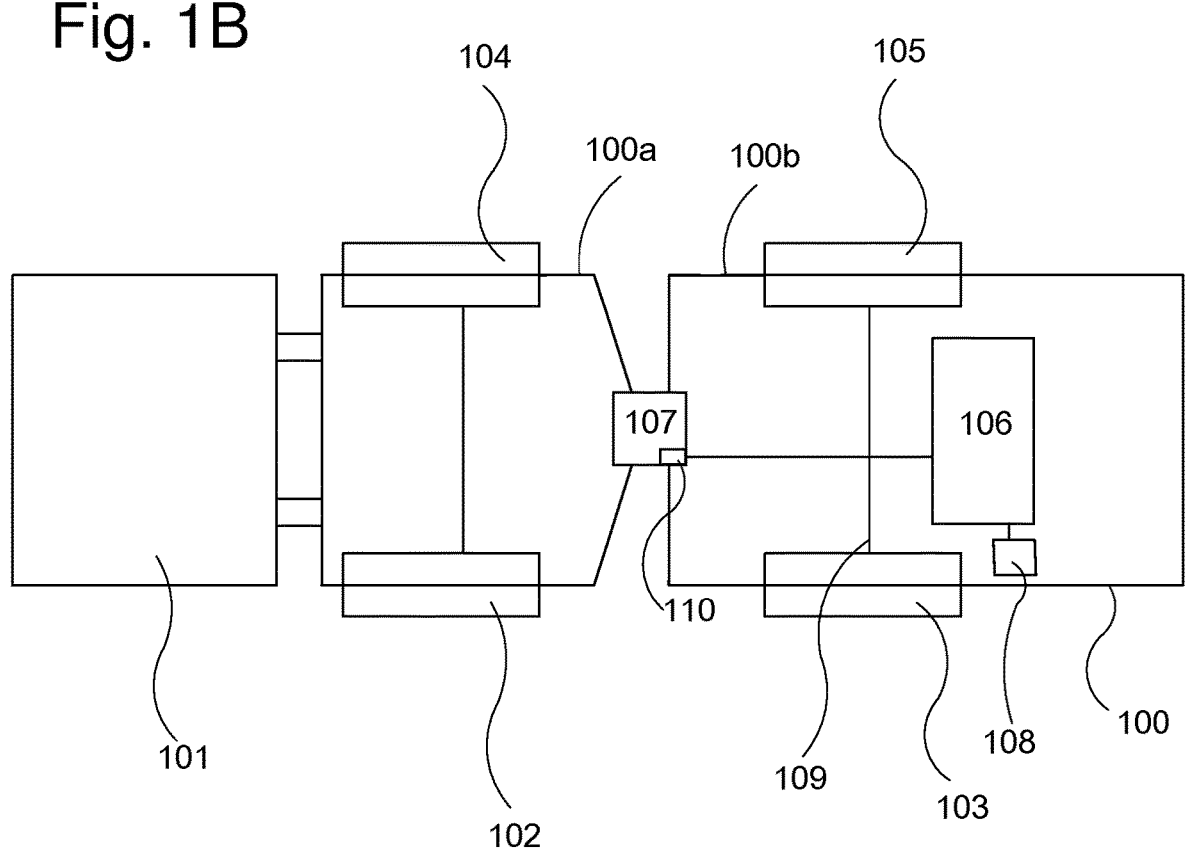

FIGS. 1A and 1B illustrates a side view and elevated view, respectively, of an exemplary machine 100 which may be used in a system utilizing the present invention. According to the present example, the machine 100 is a load-haul-dump (LHD) machine, and is used to load and transport away materials such as excavated rock through the use of a bucket 101. The machine 100 comprises, apart from the bucket 101, wheels 102-105 and a control system comprising at least one control unit 106. The control unit is configured to control various of the functions of the machine 100. Machines of the disclosed kind may comprise more than one control unit, where each control unit, respectively, may be arranged to be responsible for different functions of the machine 100. For example, a control unit may be configured to control various actuators/motors/pumps etc., e.g. for manoeuvring the machine and bucket. In case the machine is a drilling rig, the control system may e.g. be configured to control e.g. booms of the drilling rig and one or more drilling machines of the drilling rig. Similarly, the control system may be configured to control relocation of the drilling rig in a mine.

Returning to the machine illustrated in FIGS. 1A-B, the control unit controls data to be transmitted to and from the machine 100, where data transmission is carried out by a transceiver 108. The machine 100 further constitutes an articulated machine, where a front portion 100a is connected to a rear portion 100b by means of a hinge 107, and is consequently steered by means of articulated steering to facilitate manoeuvring of the machine. Machines of the disclosed kind are often driven in surroundings where the distance to surrounding rock walls may be small, which may render manoeuvring of a non-articulated machine with conventional front and/or rear wheel steering difficult to perform. As is appreciated by the person skilled in the art, the illustrated machine merely forms an example of usability of the invention, and, in principle, the invention is applicable for essentially any kind of mining at/or construction machine where a reliable data communication over a wireless link is of importance.

The illustrated machine 100 further comprises a front 111 and a rear 112 video camera, which are connected to the control unit 106 and which transfers video signals to the control unit for further transmission using the transceiver 108, e.g. to a remote-control operator in a control room. Machines of the disclosed kind may comprise various further features. For example, the machine may be provided with range detectors 114, 115, such as laser scanners, to determine distances e.g. to surrounding rock and/or obstacles in the travel path of the machine.

Figure 2:
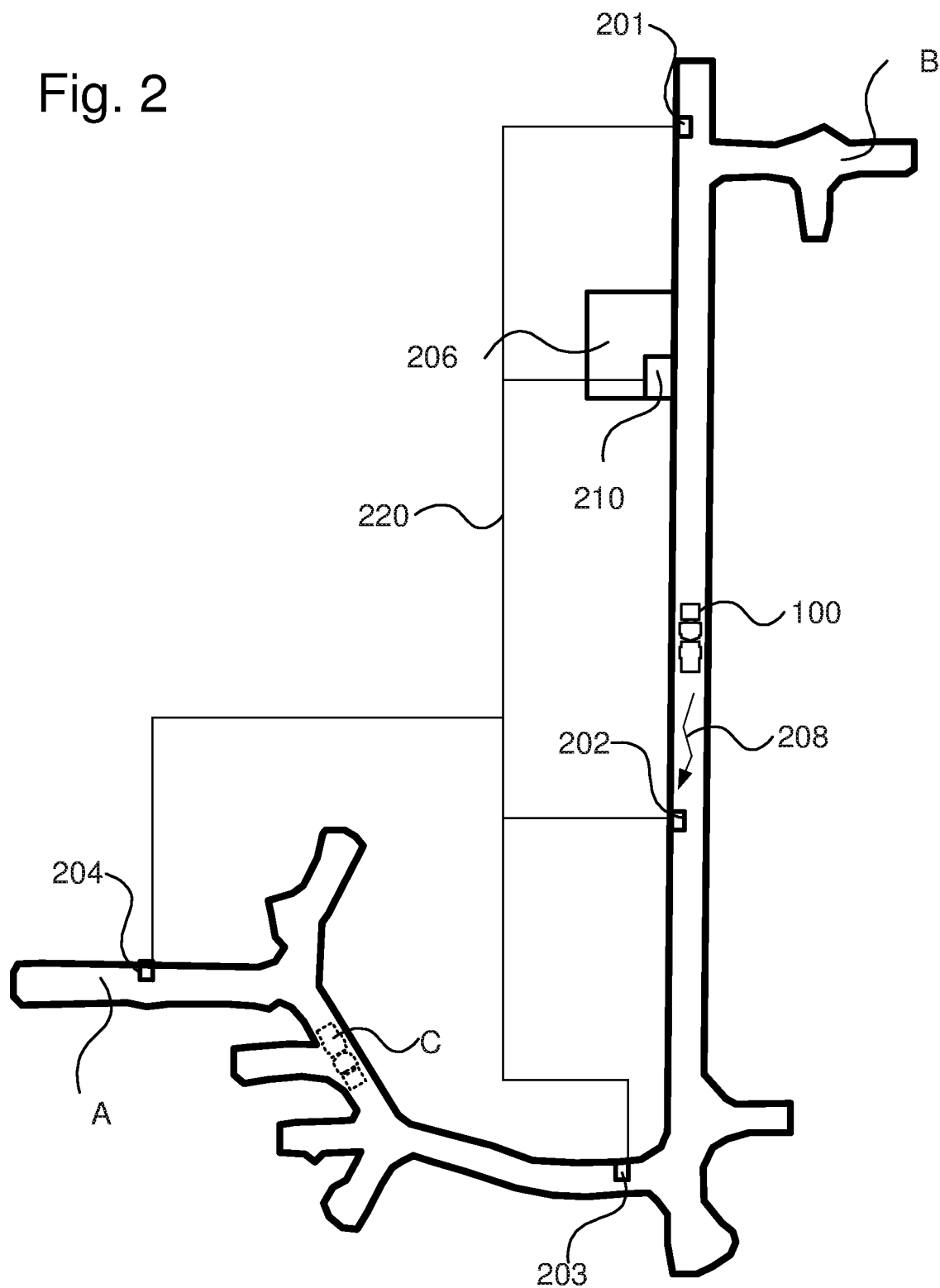
FIG. 2 illustrates an exemplary portion of a mine in which embodiments of the invention may be utilised.

FIG. 2 illustrates an example of a portion of a mine where the present invention may be utilized e.g. when operating one or more machines of the kind illustrated in FIGS. 1A-B. FIG. 2 illustrates the exemplary machine 100, which by means of remote control loads excavated rock, e.g. resulting from previous blasting, using the bucket 101 at a location A, and where the loaded rock is then transported to a location B in a different part of the mine for further processing.

FIG. 2 only illustrates the portion of the mine in which the exemplary machine 100 at present is moving. Consequently, a mine may comprise a large number of further drifts etc. that are not disclosed by the figure. Furthermore, various machines may simultaneously be operating in a same portion of a mine, but for reasons of simplicity only a single machine 100 is illustrated in FIG. 2. The remote control according to the present example is carried out in a control room 206, which is schematically illustrated, where an operator may be located when remotely controlling the machine 100, for example through the use of a remote-control station 210, which e.g. may consist of one or more computers. The control room 206 may, as in the present example, be located in the mine in the vicinity of the area in which the machine 100 is operating, but may also be located at a greater a smaller distance from the area in which the machine 100 is being manoeuvred through the remote control. For example, the control room 206 may be located on the surface of an underground mine in which the machine 100 being remote-controlled is operating. The remote control may also be performed from a control station being located in another part of the world (continent) than the part of the world in which the mine is located, e.g. in a regular office of an office building or other suitable location.

The machine 100 is configured for communication with the remote-control station 210 via a computer network 220. The computer network may, as is illustrated by lines in FIG. 2, comprise wired portions, indicated by solid lines, where this is possible. For example, the mine may comprise an extensive wired computer network interconnecting various part of the mine. The mine may also be connected to the outside world, e.g. to allow remote control as described above where such interconnection in general also takes place through a wired network such as e.g. the Internet. However, since the machine 100 is moving around in the mine, at least part of the communication needs to be performed through the use of a wireless interface. The machine 100 is therefore configured to communicate with the communication network through a wireless link, where the wireless link may be established with one or more wireless access points of the communication network 220, such as access points 201-204 in the present example. A mine of the kind disclosed in FIG. 2 may comprise a number of wireless access points providing wireless access to the network 210, where the wireless access points 201-204 may be positioned in the mine in an attempt to provide sufficient network coverage to allow the desired operation of machines the operation of which is relying on wireless transmission capability.

The established wireless communication link between the machine 100 and the remote-control location is, in the present example, utilized to transmit information between the machine 100 and the remote-control station 210 of the control room 206. The remote-control station 210 hence constitute a network node that the machine 100 communicates with. According to the present example, the machine 100 communicates with the remote-control station 210 over a wireless link 208 established with wireless access point 202.

With regard to the data being communicated, the remote-control station may, for example, transmit control commands which, for example, may comprise steering signals regarding various manoeuvring means of the machine in order to accomplish a desired movement of the machine. The control commands may, for example, constitute requests for a particular speed of movement of the machine 100 when traveling the mine, commands for manoeuvring the bucket, and steering commands, which e.g. may be used by the control unit 106 to set a suitable modulation of the joint 107 to steer the machine in accordance with the requests of the operator etc. The machine 100, in turn, may transmit data to the remote-control station 210 to allow and facilitate a remote-control operator to properly manoeuvre a machine in the mine from a remote-control station. This data may, for example, comprise video streams from the one or more video cameras 111, 112 being located on the machine 100. Furthermore, the machine 100 may transmit data relating to current steering angle of the joint 107, current speed of the machine, data regarding the current orientation of the bucket etc. Also, signals from various sensors being located on the machine 100 may be transmitted to the remote-control station 210. The transmission and reception of data over the wireless link may be arranged to be carried out by a radio transceiver 108 being in connection with the control unit 106.

The one or more video streams being transmitted to the control station 210 may, for example, be presented on one or more displays being present in the control room 206 to allow the operator to use video images for orientation in the surroundings of the machine 100 and manoeuvre the machine in a desired manner. In order to further facilitate the remote control of the machine, other data, such as data from laser scanners 114, 115 can also be used in addition to said video data. The laser scanners 114, 115 may measure distances to surrounding rock/obstacles, and this data may, for example, used to illustrate the machine 100 from the above in relation to surrounding rock/obstacles to facilitate, for example, an estimation of the lateral clearance distance of the machine 100. The video data, in turn may facilitates detection of obstacles that are not disclosed by the machine view. According to embodiments of the invention, no distance measurements are transmitted to the control station.

The data communication may be arranged to be at least partly or fully controlled by the machine control unit 106 or by any other suitable control unit located on the machine 100 and which is connected to and/or integrated with one or more radio transceivers 108 for transmission/reception of data over the wireless interface.

The wireless link may be realised utilising any suitable standardized data transmission technology for the wireless transmission. For example, wireless local area network (WLAN), WiMAX, wireless mesh networks, any suitable telecommunication standard or any other suitable wireless technology/standard to achieve the desired wireless transmission. The use of a number of wireless access points, as in present example, may allow the communication between the network and the machine 100 to be transferred, e.g. through the use of handover, from one access point to another as the position of the machine changes to thereby ensure continuous control of the machine 100.

The transmission capacity of the wireless link may vary in dependence of the current position of the machine 100 in relation to the wireless access points 201-204. If the machine 100 is located at a larger distance from a closest access point, and/or the direct path to an access point being at least partially obscured by rock (e.g. as indicated by machine position C in FIG. 2 where neither access point 203 or access point 204 are within direct view of the machine) and/or if the signal from the closest access point is disturbed e.g. by another access point being present in the mine and/or one or more other machines are communicating over the wireless interface, the transmission capacity of the wireless link may be reduced to a level that is insufficient to transfer data at the rate at which the machine currently attempts to transmit data. As was mentioned above, this may have as result that the machine becomes "lost" in regard of possibility to communicate with the machine, and in a worst case the machine may have to be manually recovered and returned into operation by a person physically visiting the machine. Situations of this kind are undesirable, and the present invention aims to at least reduce problems of this kind through the use of a method as exemplified in FIG. 3.

The method starts in step 301 where it is determined whether there is data to be transmitted from the machine 100. This may be the case, for example, as soon as the machine 100 is being started up and/or the machine receives a request e.g. from an operator at a remote-control station to remotely operate the machine. The determination may also be arranged to be performed for various other situations, such as each time it out e.g. a currently inactive video camera is activated e.g. because the machine changes a direction of travel and/or in situations when the machine is about to load or unload excavated rock where the use of an additional video camera may facilitate such manoeuvres.

When it is determined that there is data to be transmitted the method continues to step 302, where a measure of the available communication capacity is estimated.

Access points providing wireless access to a communication network to one or more devices that connect to the access point in general transmits a beacon signal or the like, which may comprise an identity of the access point. Such beacon signals may be utilised by the machine 100 to determine a signal strength of the access point. A high signal strength may be used as a measure indicating that the wireless link quality is good and that hence comparatively large amounts of data can be transmitted between the mining and/or construction machine and the access point for which the signal strength has been determined.

In reality, however, this may not be the actual case. Even though the signal strength may be high, and hence indicate good transmission conditions, there may be other machines already communicating with the access point, thereby taking at least part of the available communication capacity into account. Also, signals from one or more other access points, and/or communication between other machines and other access points, may interfere with data communication once commenced. Hence, in reality, a determination based on signal strength of a beacon may result in a determination of available communication capacity that differs substantially from the actual capacity that is available for communication. If the machine then attempts to transmit large amounts of data to this access point, large amounts of packages may be lost and hence requiring retransmissions that further increase the load on the system.

When communication of data is ongoing a signal strength determination can be made that more adequately reflects the actual available transmission capacity, but then it may be too late due to the amounts of data already being transmitted and which quickly may congest the communication channel.

According to the invention, therefore, instead or in addition, the wireless link capacity is estimated by determining a round-trip time (RTT), also commonly denoted round-trip delay time, for communication between the machine and a node of the communication system 220. The round-trip time may be determined by the machine 100 time stamping and transmitting a data package, to a node of the communication system 220. The transmission is performed via the wireless link that is to be evaluated, in the present example e.g. via access point 202 and hence following a communication with the access point 202 having been established. The time it takes to receive a response is then measured and a round-trip time is thereby estimated.

The particular method to be used to accomplish this may be any suitable method. For example, operating systems oftentimes provide functionalities such as "ping" functionality by means of which one node in a communication system may "ping" another node of the communication system to thereby obtain a measure of the round-trip time. Such "ping" functionality may be utilised according to the invention.

The well-known "ping" solution is merely an example of a manner in which a round-trip time may be determined. It is also contemplated that other kinds of solutions are used. For example, an application may be installed for this matter on a server in the communication system, and with which the machine may communicate one or more data packages to be acknowledged, e.g. by being returned upon receipt so that round-trip time can be determined.

The round-trip time may be measured between the machine 100 and, in principal, any suitable node of the communication system 220. This node may, for example, be the remote-control station 210 or the wireless access point 202 the machine communicates with. Since it is in general the case that the total delay that constitute the round-trip time consists almost exclusively to delays caused by the wireless interface and not the wired portion of the network the computer network node being used in the determination may also be any other suitable node of the communication network 220, such as any suitable server, computer or other means. The fact that the round-trip time consists almost exclusively to delays caused by the wireless interface is why the round-trip time may constitute a good measure of the wireless link quality.

According to embodiments of the invention, the initiation of the determination of the round-trip time is performed by the machine. This has, inter alia, the advantage that the determination can be formed whenever considered suitable by the machine, e.g. prior to commencing communication with the remote-control station, and/or at regular intervals. The determination of the round-trip time may, however, also be initiated from any suitable communication system node, and the result may be communicated to the machine, and transmission rate to be used by the machine may also be communicated in such an embodiment.

With regard to estimating the measure of the communication capacity, the higher the load on the wireless link, the higher the round-trip time will be. The round-trip time is not dependent, or at least need not be dependent, on the signal strength, since the signal strength, as explained, may be high also in situations when the wireless access point is subjected to high load. The use of round-trip time as a measure of the communication capacity may therefore provide a more accurate measure of the actually available communication capacity, so that in response to an increase in round-trip time the amount of data may be reduced even though signal strength still is high. The use of round-trip time also allows that the amount of data to be transmitted may be reduced at an earlier stage than otherwise might be performed, which thereby may reduce the risk for the communication becoming lost altogether.

When the measure of the communication capacity has been determined in step 302 the method continues to step 303, where it is determined whether the estimated available communication capacity is sufficient for the intended transmission rate of data to be transmitted. With regard to this determination, there may be, for example, a table translating various round-trip delays to communication capacity, where the communication capacity e.g. may be expressed in bit rates such as bits per second. The table may then list various round-trip delays and corresponding maximum round-trip delays. According to embodiments of the invention, a mathematical expression may be utilized to calculate an available communication capacity, such as possible transmission bit rate, from a determined round-trip time. The relationship between round-trip time and available communication capacity may, for example, be determined using actual tests, and a model representation may be determined from such tests.

The determination may also be arranged to be performed e.g. for some suitable number of distinct data transmission rates. For example, it may be determined a maximum round-trip delay that may prevail in order to use a particular transmission rate in the transmission where hence round-trip delay limits may be determined e.g. for data rates that may be utilized. For example, a maximum round-trip delay may be determined for the maximum data rate at which transmission may occur from the machine. There may further be distinctive levels to which the transmission rate may be reduced e.g. by lowering video image quality and/or frame rate and/or omitting transmission of data being less critical than control data and video data so that a determined round-trip delay in a simple manner can be translated into a data transmission rate to be utilized during the transmission.

If it is determined in step 303 that the available communication capacity is equal to or exceeding the communication capacity at which the machine intends to transmit data, the method continues to step 305 to commence the transmission. If, on the other hand, it is determined in step 303 that the available communication capacity is not sufficient to allow the transmission at the desired transmission rate, the method continues to step 304 where it is determined whether the current transmission rate is a minimum possible transmission rate of the machine 100 to ensure proper operation.

If this is not the case, the method continues to step 306 where the desired transmission rate is reduced to a lower level. This reduction may be accomplished e.g. according to that which has been described above, and hence e.g. video frame rate and/or video resolution may be reduced for one or more video streams. In addition or alternatively, data where the transmission is not critical to the operation of the machine can be given a low priority so that such data may not be transmitted at all, or only to a reduced extent when communication capacity is limited. As was mentioned, such data may first be prevented from being transmitted before the transmission rate of the video stream data is reduced.

As was mentioned, a number of transmission rate levels may be defined and it may first be determined whether transmission may be performed at the highest desired transmission rate level, and if this is not possible, the desired transmission rate may be reduced to second-highest level after which the method may return to step 303 to again determine if the available capacity now is sufficient to allow transmission at the reduce transmission. That is, the types of data being transmitted may be further reduced, and/or video stream data may be further reduced. If this is not the case, the transmission rate may be further reduced until transmission is possible at the currently available communication capacity, where e.g. only control data may be transmitted, or it is determined in step 304 that communication no longer can be reduced. According to embodiments of the invention, a transmission rate is determined directly using the round-trip time.

If it is determined in step 304 that the available communication capacity does not even correspond to the lowest possible level of transmission of the machine, transmission may anyway be attempted since a successful transmission allows continued operation. Alternatively, the machine may be stopped pending an increase in the available communication capacity, where the measure may be performed at regular intervals to determine if conditions improve to an extent where communication may again be resumed. In either case the operator may be notified step 307. The method may then e.g. wait a period of time prior to again determining the round-trip time, or simply return to step 301 from step 307 to again determine the round-trip time. When transmission has been commenced in step 305, the method may be arranged to return to step 301 to determine whether there is still data to transmit and again perform a determination of the communication capacity to adapt the data transmission rate if necessary. The method may include functionality such that at least a predetermined period of time lapses between two consecutive determinations of the available communication capacity to reduce resource usage.

When it is determined that the communication capacity increases, the data to be transmitted can again be increased, where data to be transmitted may be prioritised as above for as long as the communication capacity is reduced.

According to embodiments of the invention, transmission may first be commenced at a lower than maximum or even lowest data transmission rate to be increased when a measurement of the communication capacity has been performed and has been concluded that the communication capacity can manage a higher data transmission rate.

The round-trip time may hence be arranged to be re-determined at suitable intervals after transmission of data has commenced, and the re-determination may be configured to be performed at intervals allowing changes, in particular prolonged round-trip times, to be detected at an early stage to thereby detect deteriorations in the communication. Hence, according to embodiments of the invention, not only round-trip time is determined, but also changes in round-trip time as time progress. The system may be configured to regularly monitor the round-trip time to determine if the round-trip time, over time, is increasing.

A continuing increase in round-trip time may indicate a continuously ongoing decrease in communication capacity, and the derivative of round-trip time over time can be used to predict changes in communication link capacity so that measures can be taken before problems may actually arise. Similarly, a continuously ongoing decrease in round-trip time may indicate that communication capacity is improving and the amount of data to be transmitted may also be increased in response to the decreased round-trip time. If the derivative increases at a fast rate the transmission rate may be arranged to be reduced to a lower rate than the rate that currently would be possible to use in order to reduce the risk of fast degradation of the communication capacity resulting in a congestion.

The amount of data being transmitted from the machine towards the data communication network will in general be considerably higher than the amount of data being transmitted from the data communication network (such as e.g. from remote-control station 210). The estimation/determination of the communication capacity of the wireless link may therefore advantageously be initiated and performed by hardware located in the machine and being configured to perform this determination. In this manner the machine itself may determine a suitable transmission rate for the transmission of data and also at an early stage detect when undesired situations arise and take appropriate action in response.

Furthermore, according to embodiments of the invention, the determination of available communication capacity can be combined with data regarding the position of the mining and/or construction machine.

For example, the machine may be configured to log positional data together with estimations of measures of the current communication capacity. In this way, for example, such data may be stored in a central database to assist, for example, in situations when the communication capacity is degrading. For example, if a machine is on the move and consecutive estimations of the available communication capacity indicates a continuously decreasing communication capacity this may lead to situations where finally it is decided that the machine should stop in order to prevent situations where it is lost altogether. In situations of this kind the current and future position of the machine can be correlated to a database comprising previous estimations of the communication capacity for such positions. It may then be determined that the communication capacity is degrading at the moment but as soon as the machine has travelled a bit further the capacity will again increase, and that therefore the machine should not be stopped but instead be allowed to continue moving.

Such data may also be used to determine that the machine should not continue further because previous measurements indicate that such movement may result in loss of communication. In case a number machines are operating in the same area, the logging of positional data in combination with communication capacity estimations can be stored in a central database so that measurements of other machines can be used in the determination of whether a particular machine should continue moving or not. With regard to the determination of the position of the machine, this may be performed in any suitable manner. For example, signals from two or more radio access points can be utilized to determine distances to the access points and thereby estimate the position of the machine with the knowledge of the positions of the access points. If more than two access points are used in the determination of the position triangulation may be used to perform a very precise estimation of the position of the machine. If the machine is a surface operating machine e.g. GPS signals may be utilised instead to determine the position.

The positional data can also be used to determine whether the current communication capacity is reduced in relation to previous measurements. If the communication with the machine previously has been close to be lost and it is determined that communication has deteriorated further, the machine may be stopped to prevent communication from being lost altogether. The machine may then be rerouted and/or new measurements be performed after a period of time to determine if conditions have improved. This may be the case e.g. if another machine having a negative impact on the communication has moved on to another part of the mine.

Hitherto the invention has been described largely with reference to a remote-controlled LHD machine. Embodiments of the invention are not only suitable for use in remotely controlled machines but, as has been mentioned, also for autonomously operating machines, in which case the autonomously operating machine may determine that the communication capacities deteriorating and that there is a risk of losing communication altogether. The autonomously operating machine may e.g. stop and alert personnel that is monitoring/surveilling the operation when communication capacity is degrading, or about to degrade, to a low level so that, if necessary, manoeuvring of the machine can be taken over to ensure that it does not move to a location where communication is lost altogether thereby requiring someone to physically visiting the machine to resume control and take back into operation.

Furthermore, the invention may be utilized in any kind of mining and/or construction machine being connectable to a data communication network via a wireless link. Hence, the invention is applicable also with regard to manually operated machines where there is a data communication over a wireless link. For example, an operator control drill rig may download drill plans for forthcoming rounds to be drilled and if an operator e.g. in progress of moving the machine to a location to be drilled, the operator may be notified that communication quality is dropping and possibly may be lost. In response the machine may be stopped to ensure that the drill plans are completely downloaded before continuing so that all required data for performing the job is available even if communication subsequently is actually lost.

The invention has been described mainly with regard to an underground machine, but the invention is applicable also for machines operating above ground and communicating over a wireless link.

The invention claimed is:

1. A method for controlling transmission of data in a data communication network, the transmission of data is between a mining and/or construction machine and a network node of said data communication network, said transmission of data being carried out at least partly over a wireless communication link, the method comprising:
    estimating, using a processor, a measure of a communication capacity of said wireless communication link, the estimation being based at least partly on a round-trip time of a transmission over said wireless communication link;
    adapting, using the processor, a data transmission load of said mining and/or construction machine on the wireless communication link on the basis of said measure; and
    comparing, using the processor, the data transmission load a transmission load that the mining and/or construction machine intends to impose on the wireless communication link with said measure of the communication capacity of the wireless communication link, and adapting the data transmission load of said mining and/or construction machine on the wireless communication link on the basis of said comparison.

2. The method according to claim 1, further comprising: determining the round-trip time by transmitting at least one data packet over the wireless communication link to and/or from the machine; and
    determining the round-trip time as the time it takes for a transmitter to receive an acknowledgment of receipt of said at least one data packet from the receiver.

3. The method according to claim 2, further comprising: transmitting said at least one data packet from said mining and/or construction machine to a network node of said data communication network.

4. The method according to claim 1, comprising: estimating the measure of the communication capacity of the wireless communication link by means of said mining and/or construction machine.

5. The method according to claim 1, further comprising: estimating the measure of the communication capacity of the wireless communication link prior to the mining and/or construction machine commencing transmission of data to said network node.

6. A method for controlling transmission of data in a data communication network, the transmission of data is between a mining and/or construction machine and a network node of said data communication network, said transmission of data being carried out at least partly over a wireless communication link the method comprising:
    estimating, using a processor, a measure of the communication capacity of said wireless communication link, the estimation being based at least partly on a round-trip time of a transmission over said wireless communication link; and
    adapting, using the processor, a data transmission load of said mining and/or construction machine on the wireless communication link on the basis of said measure: when adapting the data transmission load of said mining and/or construction machine on the wireless communication link, prioritising data to be transmitted on the wireless communication link based on the adaptation, wherein lower prioritised data to be transmitted is reduced or stopped from being transmitted to allow transmission of higher prioritised data.

7. The method according to claim 1, further comprising: determining if transmission load that the mining and/or construction machine imposes and/or intends to impose on the wireless communication link exceeds the estimated available communication capacity, and if the data transmission load exceeds the estimated available capacity, reducing a data transmission rate of the mining and/or construction machine to a data transmission rate resulting in a load being below the estimated capacity of said wireless communication link.

8. The method according to claim 1, further comprising: determining a plurality of consecutive round-trip times, and controlling the load that the mining and/or construction machine imposes on the wireless communication link on the basis of changes in time of the round-trip time being determined from said plurality of consecutive round-trip delays.

9. The method according to claim 8, further comprising: increasing the transmission rate of transmission of data from the mining and/or construction machine when the derivative over time of the round-trip time decreases, and/or decreasing the data transmission rate of transmission of data from the mining and/or construction machine when the derivative over time of the round-trip time increases.

10. The method according to claim 1, further including: when changing a transmission rate of transmission from said mining and/or construction machine, changing the transmission rate to one of a plurality of predefined transmission rates, said predefined transmission rates comprising a maximum transmission rate and at least one lower than said maximum transmission rate.

11. The method according to claim 1, further comprising: determining a position of the machine, and controlling the data transmission load that the mining and/or construction machine imposes on the wireless communication link on the basis of the round-trip time and said determined position of the machine.

12. The method according to claim 1, further comprising: estimating said measure of the communication capacity of the wireless communication link on the basis of, in addition to the round-trip time, one or more from the group: jitter, signal strength, the number of lost data packages per unit time, signal-to-noise ratio, bit error rate and/or data throughput.

13. The method according to claim 1, further comprising: when decreasing the transmission rate of transmission from said mining and/or construction machine, decreasing a transmission rate by any one or more from the group: reducing a video frame rate, reducing a resolution of video frames, reducing a number of transmitted video streams, preventing or reducing transmission of data being less critical than data required for remote control of the mining and/or construction machine and/or less critical than video data.

14. A non-transitory readable medium comprising instructions which, when executed by a computer, cause the computer to perform operations including:
    estimating, using a processor, a measure of the communication capacity of a wireless communication link, the estimation being based at least partly on a round-trip time of a transmission over said wireless communication link; and
    adapting, using the processor, a data transmission load of said mining and/or construction machine on the wireless communication link on the basis of said measure; and
    comparing a transmission load that the mining and/or construction machine imposes and/or intends to impose on the wireless communication link with said measure of the communication capacity of the wireless communication link, and adapting the load of said mining and/or construction machine on the wireless communication link on the basis of said comparison.

15. A system for controlling transmission of data in a data communication network, the transmission of data being a transmission of data between a mining and/or construction machine and a network node of said data communication network, said transmission of data being carried out at least partly over a wireless communication link, the system comprising:
    a processor configured to estimate a measure of the communication capacity of said wireless communication link, the estimation being based at least partly on a round-trip time of a transmission over said wireless communication link,
    the processor configured to adapt the data transmission load of said mining and/or construction machine on the wireless communication link on the basis of said measure, the processor configured to determine if the data transmission load that the mining and/or construction machine imposes and/or intends to impose on the wireless communication link exceeds the estimated available communication capacity, and if the data transmission load exceeds the estimated available capacity, reducing a data transmission rate of the mining and/or construction machine to a data transmission rate resulting in a load being below the estimated capacity of said wireless communication link.

16. A mining and/or construction machine comprising a system for controlling transmission of data in a data communication network, the transmission of data being a transmission of data between a mining and/or construction machine and a network node of said data communication network, said transmission of data being carried out at least partly over a wireless communication link, the system comprising:
    processor configured to estimate a measure of the communication capacity of said wireless communication link, the estimation being based at least partly on a round-trip time of a transmission over said wireless communication link,
    the processor configured to adapt the data transmission load of said mining and/or construction machine on the wireless communication link on the basis of said measure, the processor configured to determine if the data transmission load that the mining and/or construction machine imposes and/or intends to impose on the wireless communication link exceeds the estimated available communication capacity, and if the data transmission load exceeds the estimated available capacity, reducing a data transmission rate of the mining and/or construction machine to a data transmission rate resulting in a load being below the estimated capacity of said wireless communication link.

* * * * *